US008874167B2

(12) United States Patent
Qiu et al.

(10) Patent No.: US 8,874,167 B2
(45) Date of Patent: Oct. 28, 2014

(54) METHOD AND SYSTEM FOR MULTI-STANDBY OPERATION FOR A MULTI-SIM MULTI-STANDBY COMMUNICATION DEVICE

(75) Inventors: Xiaoxin Qiu, Bridgewater, NJ (US); Yuan Liu, Holmdel, NJ (US); Yaxin Cao, Laurence Harbor, NJ (US); Zhijun Gong, Iselin, NJ (US); Yongqian Wang, East Brunswick, NJ (US); Stephen Richards, Maidenhead (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/816,782

(22) Filed: Jun. 16, 2010

(65) Prior Publication Data
US 2011/0117962 A1    May 19, 2011

Related U.S. Application Data (60) Provisional application No. 61/261,922, filed on Nov. 17, 2009.

(51) Int. Cl.
*H04B 1/38* (2006.01)
*H04W 48/18* (2009.01)
*H04W 88/06* (2009.01)

(52) U.S. Cl.
CPC .............. *H04W 48/18* (2013.01); *H04W 88/06* (2013.01)
USPC ........ 455/557; 455/550.1; 455/509; 455/558; 370/329; 370/449; 710/64

(58) Field of Classification Search
CPC .................. H04W 4/003; H04M 3/304–3/306; H04M 15/751–15/7556; H04M 17/103
See application file for complete search history.

(56) References Cited

U.S. PATENT DOCUMENTS 6,012,113 A * 1/2000 Tuckner .......................... 710/64
6,799,155 B1   9/2004 Lindemann et al.
(Continued)

FOREIGN PATENT DOCUMENTS

CN       1798405 A    7/2006
CN     101009940 A    8/2007
(Continued)

OTHER PUBLICATIONS

Non-Final Rejection mailed Oct. 31, 2011 for U.S. Appl. No. 12/816,835, filed Jun. 16, 2010; 15 pages.
(Continued)

*Primary Examiner* — Rafael Pérez-Gutiérrez
*Assistant Examiner* — Keith Fang
(74) *Attorney, Agent, or Firm* — Sterne, Kessler, Goldstein & Fox P.L.L.C.

(57) ABSTRACT

A communication device comprises a single radio resource unit that is shared by a plurality of virtual modems (VMs), each uniquely associated with a single one of a plurality of SIM cards. Traffic related to the SIM cards are concurrently handled utilizing corresponding VMs. Available radio resource in the single radio resource unit are shared by the VMs based on corresponding VM states, namely, an active state, an idle state and a suspended state. VMs in an idle state concurrently monitor paging events and concurrently perform idle mode procedures such as location updating. VMs not related to an intended traffic are suspended. A VM related to the intended traffic is transitioned from an idle state to an active state to enable the communication for the intended traffic. Once the communication is complete, the suspended VMs are resumed to continue idle mode activities.

10 Claims, 7 Drawing Sheets

(56) References Cited

U.S. PATENT DOCUMENTS

| | | | |
|---|---|---|---|
| 6,934,551 B1* | 8/2005 | Kuriyan | 455/466 |
| 7,810,096 B2 | 10/2010 | Saito et al. | |
| 7,840,967 B1 | 11/2010 | Czajkowski et al. | |
| 8,170,614 B2 | 5/2012 | Kim | |
| 8,345,626 B2 | 1/2013 | Noh | |
| 8,369,895 B2 | 2/2013 | Lee et al. | |
| 8,472,999 B2 | 6/2013 | Zhang | |
| 2002/0103009 A1 | 8/2002 | Sato | |
| 2003/0153356 A1 | 8/2003 | Liu | |
| 2004/0209643 A1 | 10/2004 | Welsh | |
| 2005/0114448 A1 | 5/2005 | Skomra | |
| 2005/0153740 A1 | 7/2005 | Binzel et al. | |
| 2005/0220180 A1 | 10/2005 | Barlev et al. | |
| 2006/0105810 A1 | 5/2006 | Gnuschke | |
| 2006/0107174 A1 | 5/2006 | Heise | |
| 2007/0072629 A1 | 3/2007 | Bae | |
| 2007/0168951 A1 | 7/2007 | Vollmann et al. | |
| 2007/0177617 A1 | 8/2007 | Noh et al. | |
| 2007/0195733 A1 | 8/2007 | Noh | |
| 2007/0217489 A1 | 9/2007 | Bar-El et al. | |
| 2008/0056190 A1 | 3/2008 | Kim | |
| 2008/0056214 A1 | 3/2008 | Low et al. | |
| 2008/0062961 A1 | 3/2008 | Nowlan | |
| 2008/0161030 A1* | 7/2008 | Pernu | 455/509 |
| 2008/0198804 A1 | 8/2008 | Rahman et al. | |
| 2008/0200173 A1 | 8/2008 | Dalsgaard | |
| 2009/0023449 A1 | 1/2009 | Kim et al. | |
| 2009/0061934 A1 | 3/2009 | Hauck et al. | |
| 2009/0088211 A1 | 4/2009 | Kim | |
| 2009/0212908 A1 | 8/2009 | Lin et al. | |
| 2009/0293061 A1 | 11/2009 | Schwinn et al. | |
| 2009/0300605 A1 | 12/2009 | Edwards et al. | |
| 2010/0029331 A1 | 2/2010 | Gnuschke | |
| 2010/0041438 A1 | 2/2010 | Brown | |
| 2010/0061431 A1* | 3/2010 | Jyrkka et al. | 375/220 |
| 2010/0105433 A1 | 4/2010 | Lin et al. | |
| 2010/0177651 A1 | 7/2010 | Okuyama et al. | |
| 2010/0311467 A1 | 12/2010 | Wu | |
| 2010/0327459 A1 | 12/2010 | Yasumori et al. | |
| 2011/0092209 A1 | 4/2011 | Gaal et al. | |
| 2011/0117909 A1 | 5/2011 | Cao et al. | |
| 2011/0117944 A1 | 5/2011 | Cao et al. | |
| 2011/0117963 A1 | 5/2011 | Wang et al. | |
| 2011/0117964 A1 | 5/2011 | Luo | |
| 2011/0117965 A1 | 5/2011 | Gong et al. | |
| 2011/0195749 A1 | 8/2011 | Lan | |
| 2012/0115546 A1 | 5/2012 | Lin et al. | |
| 2012/0270602 A1 | 10/2012 | Card | |

FOREIGN PATENT DOCUMENTS

| | | |
|---|---|---|
| CN | 101044701 A | 9/2007 |
| CN | 101335976 A | 12/2008 |
| CN | 101370197 A | 2/2009 |
| CN | 101426295 A | 5/2009 |
| TW | 200915891 A | 4/2009 |
| WO | WO 2008/078151 A1 | 7/2008 |

OTHER PUBLICATIONS

Final Rejection mailed May 9, 2012 for U.S. Appl. No. 12/816,835, filed Jun. 16, 2010; 14 pages.
Non-Final Rejection mailed Feb. 17, 2012 for U.S. Appl. No. 12/821,673, filed Jun. 23, 2010; 16 pages.
Final Rejection mailed Jul. 18, 2012 for U.S. Appl. No. 12/821,673, filed Jun. 23, 2010; 19 pages.
Non-Final Rejection mailed Dec. 13, 2011 for U.S. Appl. No. 12/819,014, filed Jun. 18, 2010; 14 pages.
Final Rejection mailed Jun. 15, 2012 for U.S. Appl. No. 12/819,014, filed Jun. 18, 2010; 18 pages.
Non-Final Rejection mailed Feb. 17, 2012 for U.S. Appl. No. 12/901,322, filed Oct. 8, 2010; 14 pages.
Final Rejection mailed Jun. 5, 2012 for U.S. Appl. No. 12/901,322, filed Oct. 8, 2010; 16 pages.
Non-Final Rejection mailed Jun. 12, 2013 for U.S. Appl. No. 12/901,322, filed Oct. 8, 2010; 10 pages.
Non-Final Rejection mailed Dec. 30, 2013 for U.S. Appl. No. 12/821,673, filed Jun. 23, 2010; 12 pages.
Final Rejection mailed Oct. 15, 2013 for U.S. Appl. No. 12/901,322, filed Oct. 8, 2010; 12 pages.
Non-Final Rejection mailed Jul. 3, 2013 for U.S. Appl. No. 12/819,014, filed Jun. 18, 2010; 11 pages.
Final Rejection mailed Oct. 15, 2013 for U.S. Appl. No. 12/819,014, filed Jun. 18, 2010; 15 pages.
Non-Final Rejection mailed Feb. 17, 2012 for U.S. Appl. No. 12/819,039, filed Jun. 18, 2010; 17 pages.
Final Rejection mailed Jul. 17, 2012 for U.S. Appl. No. 12/819,039, filed Jun. 18, 2010; 20 pages.
Non-Final Rejection mailed Nov. 20, 2013 for U.S. Appl. No. 12/819,039, filed Jun. 18, 2010; 24 pages.
Non-Final Rejection mailed Feb. 6, 2014 for U.S. Appl. No. 12/816,835, filed Jun. 16, 2010; 11 pages.
Non-Final Rejection mailed Feb. 11, 2014 for U.S. Appl. No. 12/901,322, filed Oct. 8, 2010; 11 pages.
Office Action for related Chinese Patent Application No. 201010547856, mailed Feb. 5, 2013; 5 pages.
Office Action for related Chinese Patent Application No. 2010105440527, mailed Mar. 4, 2013; 7 pages.
Office Action for related Chinese Patent Application No. 20101544333, mailed Jan. 23, 2013; 6 pages.
Office Action for related Chinese Patent Application No. 20101544333, mailed Jul. 29, 2013; 6 pages.
Office Action for related Taiwanese Patent Application No. 20100139323, mailed Dec. 20, 2013; 10 pages.
English-language abstract of Chinese Patent Publication No. 1798405; 1 page.
English-language Abstract for Chinese Patent Publication No. 101335976 A; 1 page.
English-language Abstract for Chinese Patent Publication No. 101370197 A; 2 pages.
Final Rejection mailed May 7, 2014 for U.S. Appl. No. 12/816,835, filed Jun. 16, 2010; 14 pages.
Final Rejection mailed Apr. 23, 2014 for U.S. Appl. No. 12/821,673, filed Jun. 23, 2010; 13 pages.
Non-Final Rejection mailed Mar. 11, 2014 for U.S. Appl. No. 12/819,014, filed Jun. 18, 2010; 15 pages.
Final Rejection mailed May 28, 2014 for U.S. Appl. No. 12/901,322, filed Oct. 8, 2010; 12 pages.
Notice of Allowance mailed Jun. 13, 2014 for U.S. Appl. No. 12/819,039, filed Jun. 18, 2010; 16 pages.
Final Rejection mailed Jul. 1, 2014 for U.S. Appl. No. 12/819,014, filed Jun. 18, 2010; 16 pages.

* cited by examiner

METHOD AND SYSTEM FOR MULTI-STANDBY OPERATION FOR A MULTI-SIM MULTI-STANDBY COMMUNICATION DEVICE

CROSS-REFERENCE TO RELATED APPLICATIONS/INCORPORATION BY REFERENCE

This patent application makes reference to, claims priority to and claims the benefit from U.S. Provisional Patent Application Ser. No. 61/261,922 filed on Nov. 17, 2009.

This application makes reference to:
U.S. patent application Ser. No. 12/816,835 filed on Jun. 16, 2010.
U.S. patent application Ser. No. 12/821,673 filed on Jun. 23, 2010.
U.S. patent application Ser. No. 12/819,014 filed on Jun. 18, 2010.
U.S. patent application Ser. No. 12/819,039 filed on Jun. 18, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for multi-standby operation for a multi-SIM multi-standby communication device.

BACKGROUND OF THE INVENTION

With the development of mobile communication systems, mobile devices may utilize various mobile communication techniques such as, for example, global system for mobile communications (GSM), Universal Mobile Telecommunications System (UMTS), Long Term Evolution (LTE) network and wireless local area network (WLAN) to receive desired services. In instances where a mobile device subscribes to a communication network, subscriber information may be required to identify the mobile device to the network for various network services such as authentication, accounting, billing and security services. The subscriber information may be stored in a subscriber identity module (SIM) card inserted in the mobile device. A SIM card is a card or a chip installed in the mobile device providing information to identify the subscriber carrying the mobile device to networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for multi-standby operation for a multi-SIM multi-standby communication device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multi-standby operation for a multi-SIM multi-standby communication device. In various embodiments of the invention, a multiple-subscriber identity module (multi-SIM) multi-standby communication device comprises a single radio resource unit providing layer 1, namely, physical layer (PHY), and RF, for example, functionalities. The single radio resource unit is shared by a plurality of virtual modems (VMs) implemented in a virtual modem architecture (VMA). The VMA is deployed on the single radio resource unit to handle operations in a multi-standby mode. The VMA comprises a plurality of virtual modems (VMs), a virtual modem framework (VMF) and a virtual modem controller (VMC). Each of the plurality of VMs is uniquely associated with a single one of a plurality of SIM cards that are coupled to the multi-SIM multi-standby communication device.

The multi-SIM multi-standby communication device is operable to concurrently handle traffic related to each of the SIM cards utilizing a corresponding one of the plurality of VMs. Available radio resource in the single radio resource unit are shared by each of the plurality of VMs based on corresponding VM states, namely, an active state, an idle state and a suspended state. For example, the VMC may be configured to guarantee the usage of radio resources for VMs in an active state. VMs in a suspended state are not be allowed to use or share radio resources available in the single radio resource unit. Limited radio resources may be provided or allocated to VMs in an idle state to support idle mode activities such as neighbor cell monitoring and measurements.

VMs in an idle state may be operable to concurrently monitoring paging events to detect or check incoming traffic, and concurrently perform idle mode tasks and/or procedures such as, for example, cell measurement, cell selection and/or cell reselection. One or more VMs that are not related to detected intended traffic may be suspended based on the available radio resources in the single radio resource unit and/or user expectation. A specific VM that is related to the detected intended traffic is transitioned from an idle state to an active state in order to handle communication and/or processing of the detected intended traffic. Once the communication is complete, the specific VM may indicate that radio resources that were previously allocated may no longer be needed. As a result, the VMC may transition the suspended VMs from the suspended state to the idle state to resume idle mode activities and/or tasks.

Figure 1:
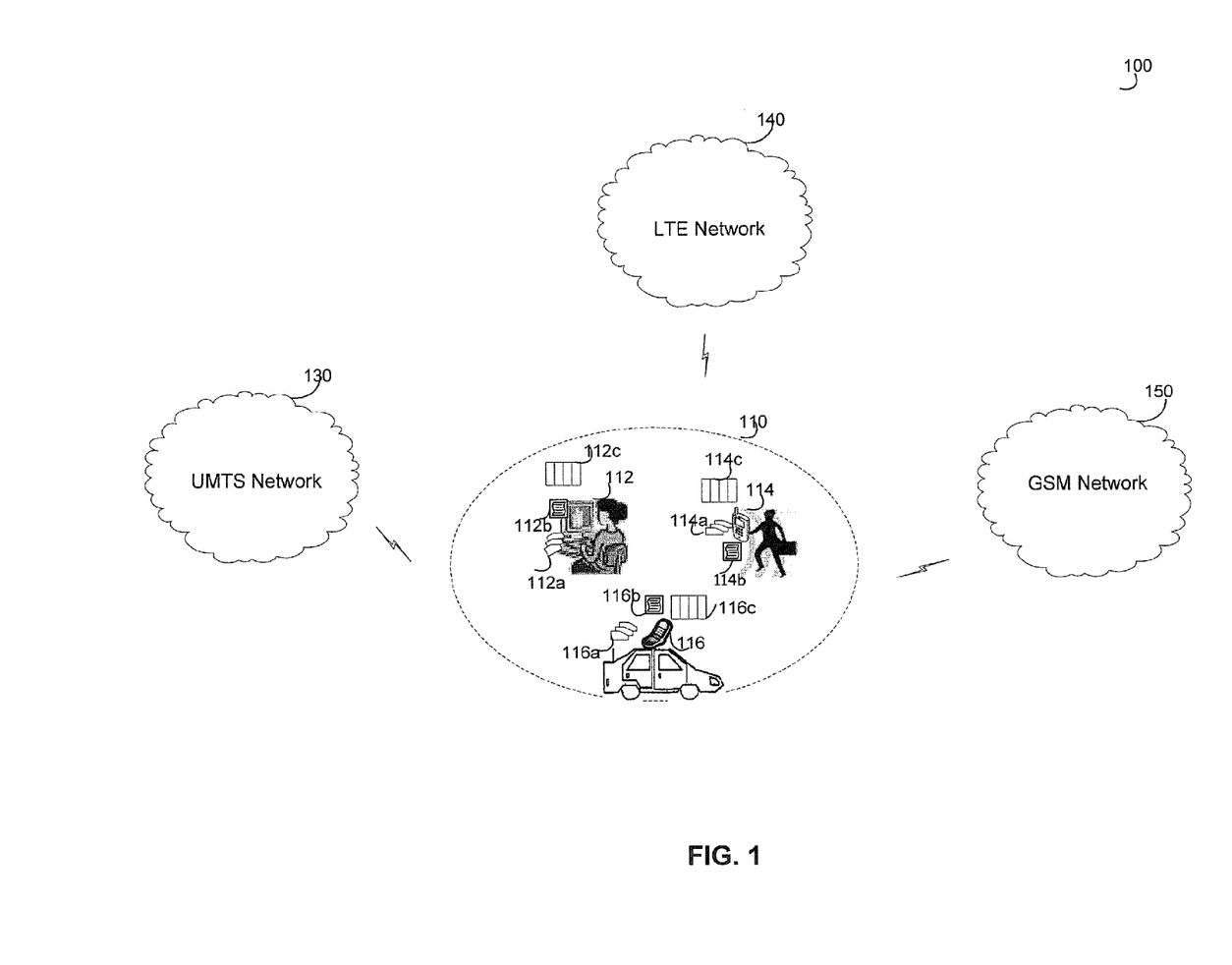
FIG. 1 is a diagram illustrating an exemplary communication system that is operable to utilize virtual modems to support multi-standby operation for a multi-SIM multi-standby communication device, in accordance with an embodiment of the invention.

FIG. 1 is a diagram illustrating an exemplary communication system that is operable to utilize virtual modems to support multi-standby operation for a multi-SIM multi-standby communication device, in accordance with an embodiment of the invention. Referring to FIG. 1, there is shown a communication system 100. The communication system 100 comprises a plurality of mobile devices 110, of which multi-SIM multi-standby communication devices 112-116 are illustrated, a UMTS network 130, a Long Term Evolution (LTE) network 140, and a GSM network 150.

A multi-SIM multi-standby communication device such as the multi-SIM multi-standby communication device 112 may comprise suitable logic, circuitry, interfaces and/or code that are operable to communicate or support various network services such as authentication, billing and/or security with a plurality of communication access networks such as, for example, the UMTS network 130, the LTE network 140, and the GSM network 150. Multiple SIM cards such as SIM cards 112a may be inserted in the multi-SIM multi-standby communication device 112 whenever needed. The inserted SIM cards 112a may be coupled or connected with the multi-SIM multi-standby communication device 112 through one or more SIM card sockets or connections. The multi-SIM multi-standby communication device 112 may read or retrieve SIM identification information from the SIM cards 112a via the one or more SIM card sockets or connections. The retrieved SIM identification information may be stored within the multi-SIM multi-standby communication device 112 to support various network services such as authentication, billing and security whenever needed. In this regard, the multi-SIM multi-standby communication device 112 may be configured to activate the retrieved SIM identification information either on one SIM card at a time or on multiple SIM cards at the same time depending on implementation and/or device configuration. In instances where the retrieved SIM identification information is activated on one SIM card at a time, the multi-SIM multi-standby communication device 112 may operate in a single-standby mode. In instances where the retrieved SIM identification information is activated on two or more SIM cards at the same time, the multi-SIM multi-standby communication device 112 may operate in a multi-standby mode. In this regard, the multi-SIM multi-standby communication device 112 in a multi-standby mode may be operable to support multiple subscriptions at the same time. A user of the multi-SIM multi-standby communication device 112 may be allowed to utilize multiple numbers, multiple different service plans and/or network carriers at the same time whenever the multi-SIM multi-standby communication device 112 is in a multi-standby mode. A single radio resource unit may comprise suitable logic, circuitry, interfaces and/or code that are operable to provide PHY and RF functionalities to support desired services on a communication device. For example, single radio resource unit 112c-116c may be integrated into the multi-SIM multi-standby communication devices 112-116, respectively, for PHY and RF support.

In various exemplary embodiments of the invention, the multi-SIM multi-standby communication device 112 may deploy a VMA 112b over the single radio resource unit 112c to support a multi-standby mode. The VMA 112b may be configured to concurrently handle multiple tasks or instances over the single radio resource unit 112c. Each of tasks or instances is associated with one of the multiple SIM cards 112a. A task may also be called an instance of a process. An air interface protocol stack and/or a Common Application Programming Interface (CAPI) module may comprise multiple tasks. A collection of air interface protocol stack tasks and/or CAPI tasks associated with a single SIM card together with appropriate physical layer (PHY), DSP functionalities, and/or RF functionalities supported by the single radio resource unit 112c is referred to as a Virtual Modem (VM). Each VM in the VMA may be assigned to handle instances related to one of the multiple SIM cards 112a. A VM may be placed or may operate in one of three VM states, namely, an active state, an idle state or a suspended state. In the active state, radio resources are assigned to the VM and a valid or active connection between a VM and an associated cell is established for data and/or voice communication.

The VM may be allowed to utilize radio resources available in the single radio resource unit 112c to communicate or support services related to a specific SIM card. In the idle state, no valid or active connection between the VM and an associated cell is established, however, associated registration information is retained in the associated cell/network. In the idle state, the VM may be allowed to utilize radio resources available in the single radio resource unit 112c to monitor paging events and to perform normal idle mode activities such as cell selection/reselection. In the suspended state, a VM may be suspended from using radio resources available in the single radio resource unit 112c. Before entering the suspended state, the VM may need to suspend or abort procedures such as, for example, data transfer, operating band change and/or manual public land mobile network (PLMN) search, which are currently being executed on the VM.

In various exemplary embodiments of the invention, the VMA 112b may be configured to arbitrate and/or resolve contention between VMs for radio resources via the transition of the VM among one or more of the three VM states. For example, the VMA 112b may ensure that at most one of the plurality of VMs in the VMA 112b is in the active state for a given time instant. In other words, no two or more VMs may be allowed to be in an active state at the same time. In this regard, the VMA 112b may be operable to suspend one or more of the plurality of VMs from using or sharing radio resources available in the single radio resource unit 112c to ensure an uninterrupted radio resource usage by a specific VM. Whenever radio resources in the single radio resource unit 112c become available for sharing, the suspended VMs may be resumed to continue idle mode activities, for example.

In various exemplary embodiments of the invention, the VMA 112b may be configured to coordinate the usage of radio resources available in the single radio resource unit 112c to support concurrent procedures initiated by two or more VMs in the VMA 112b via a time multiplexing method, for example. Two or more VMs in the VMA 112b may be operable to share radio resources available in the single radio resource unit 112c to monitor paging events in order to check incoming calls and/or SMS, for example. In another example, two or more VMs in the VMA 112b may share radio resources available in the single radio resource unit 112c to perform idle mode procedures or activities such as, for example, cell selection/reselection.

The UMTS network 130 may comprise suitable devices, circuitry, interfaces and/or code that are operable to provide data and/or voice services to various UMTS capable communication devices such as the multi-SIM multi-standby communication device 112 using UMTS technology. In this regard, the UMTS network 130 may be operable to authenticate users such as the multi-SIM multi-standby communication devices 112-116 for UMTS access utilizing SIM cards. A SIM card for UMTS is also known as universal subscribe identity module (USIM). Only authorized users may access the UMTS network 130. The UMTS network 130 may be operable to check the validity of USIM identification information on one or more USIM cards coupled to, for example, the multi-SIM multi-standby communication device 112. The UMTS network 130 may determine whether the multi-standby communication device 112 is allowed to access the UMTS network 130 for various network services such as, for example, authentication, accounting and/or billing services.

The LTE network 140 may comprise suitable devices, circuitry, interfaces and/or code that are operable to provide data and/or voice services to various LTE capable communication devices such as the multi-SIM multi-standby communication device 112 using LTE technology. In this regard, the LTE network 140 may be operable to authenticate users such as the multi-SIM multi-standby communication devices 112-116 for LTE access utilizing SIM cards. A SIM card for LTE is also known as Universal Integrated Circuit Card (UICC). Only authorized users may access the LTE network 140. The LTE network 140 may be operable to check the validity of UICC identification information on one or more UICCs coupled to, for example, the multi-SIM multi-standby communication device 112. The LTE network 140 may determine whether the multi-SIM multi-standby communication device 112 is allowed to access the LTE network 140 for various network services such as, for example, authentication, accounting and/or billing services.

The GSM network 150 may comprise suitable devices, circuitry, interfaces and/or code that are operable to provide data and/or voice services to various GSM capable communication devices such as the multi-SIM multi-standby communication device 112 using GSM technology. In this regard, the GSM network 150 may be operable to authenticate users such as the multi-SIM multi-standby communication devices 112-116 for GSM access utilizing SIM cards. Only authorized users may access the GSM network 150. The GSM network 150 may be operable to check the validity of SIM identification information on one or more SIM cards coupled to, for example, the multi-SIM multi-standby communication device 112. The GSM network 150 may determine whether the multi-SIM multi-standby communication device 112 is allowed to access the GSM network 150 for various network services such as, for example, authentication, accounting and/or billing services.

In an exemplary operation, a multi-SIM multi-standby communication device such as the multi-SIM multi-standby communication device 112 may be connected or coupled with multiple SIM cards such as the SIM cards 112a through one or more SIM card sockets or connections. SIM identification information on the multiple SIM cards may be utilized on one SIM card at a time and/or on multiple SIM cards at the same time depending on implementation. SIM identification information on each of the multiple SIM cards 112a may be communicated to the multi-SIM multi-standby communication device 112 through the one or more SIM card sockets.

The multi-SIM multi-standby communication device 112 may operate in a single-standby mode or a multi-standby mode depending on device configuration and/or user preferences. A user of the multi-SIM multi-standby communication device 112 in a multi-standby mode may be allowed to utilize SIM identification information associated with each of the multiple SIM cards 112a to receive corresponding services at the same time.

In an exemplary embodiment of the invention, multiple numbers, multiple different service plans and/or network carriers associated with each of the multiple SIM cards 112a may be utilized at the same time on the multi-SIM multi-standby communication device 112. In this regard, the multi-SIM multi-standby communication device 112 may be operable to utilize the VMA 112b over the single radio resource unit 112c to support a multi-standby mode. The VMA 112b may be operable to receive services associated with the multiple SIM cards 112a at the same time. Each VM in the VMA 112b is assigned to serve one of the multiple SIM cards 112a. For a given time instant, a VM may be in one of the three VM states, namely, an active state, an idle state and a suspended state. The VMA 112b may be configured to manage contention from associated VMs for radio resources available in the single radio resource unit 112c. The VMs in the VMA 112b may be operable to utilize radio resources available in the single radio resource unit 112c to monitor paging events. Incoming traffic related to corresponding SIM cards may be detected from the monitored paging events. In the idle state, the VMs in the VMA 112b may be operable to perform normal idle mode activities utilizing the radio resources available in the single radio resource unit 112c.

Figure 2:
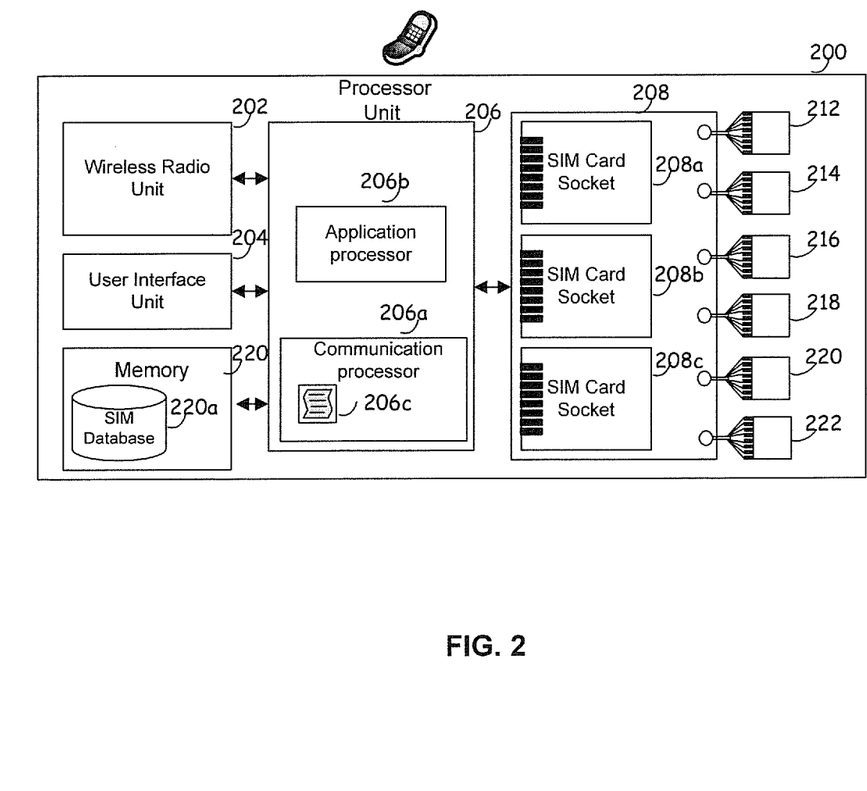
FIG. 2 is a block diagram illustrating an exemplary multi-SIM multi-standby communication device that utilizes a virtual modem framework to support multi-standby operation, in accordance with an embodiment of the invention.

FIG. 2 is a block diagram illustrating an exemplary multi-SIM multi-standby communication device that utilizes a virtual modem framework to support multi-standby operation, in accordance with an embodiment of the invention. Referring to FIG. 2, there is shown a multi-SIM multi-standby communication device 200. The multi-SIM multi-standby communication device 200 comprises a wireless radio unit 202, a user interface unit 204, a processor unit 206, a SIM card controller 208 comprising SIM card sockets 208a-208c, a plurality of SIM cards, of which SIM cards 212-222 are illustrated, and a memory 220. The SIM cards 212-222 are coupled to the multi-SIM multi-standby communication device through the SIM card sockets 208a-208c. The memory 220 comprises a SIM database 220a.

The wireless radio unit 202 may comprise suitable logic, circuitry, interfaces and/or code that may be operable to communicate radio frequency signals with various communication networks such as, for example, the LTE network 140 and the GSM network 150. SIM identification information that is retrieved from one or more of the SIM cards 222-228 may be communicated via the wireless radio unit 202 to identify the multi-SIM multi-standby communication device 200 to network for desired network services such as accounting/billing services.

The user interface unit 204 may comprise suitable logic, circuitry, interfaces and/or code that may enable a user to interact with the multi-SIM multi-standby communication device 200. For example, the user interface unit 204 may be operable to present the user with information on SIM cards available to the multi-SIM multi-standby communication device 200. The user interface unit 204 may allow the user to enter a preferred SIM card selection and/or a desired application selection.

The processor unit 206 may comprise suitable logic, circuitry, interfaces and/or code that may be operable to manage and/or control operations of device components such as, for example, the wireless radio unit 202, the user interface unit 204, the SIM database 220a, and/or the SIM card controller 208. For example, the processor unit 206 may be operable to coordinate and/or control operations of the SIM card controller 208 in response to a SIM card selection from the user interface unit 204. The processor unit 206 may also be operable to run a specific application via the application processor based on an application selection from the user interface unit 204.

The processor unit 206 may be operable to select one or more SIM cards based on user preferences and/or device configuration. The processor unit 206 may communicate the SIM card selection information to the SIM card controller 208 so that the selected one or more SIM cards may be connected to the SIM card sockets 208a-208c and thereby to the processor unit 206. The selected SIM cards may be actively connected to the SIM card controller 208 to enable downloading of corresponding SIM identification information into the SIM database 220a of the multi-SIM multi-standby communication device 200. Notwithstanding, in accordance with various embodiments of the invention, after SIM identification information is downloaded from each of the selected SIM cards such as the SIM cards 212-222 into the SIM database 220a of the multi-SIM multi-standby communication device 200, the SIM identification information corresponding to one or more of the plurality of SIM cards may be in an active state or in a standby state in the SIM database 220a. More specifically, at a given time instant, SIM identification information actually being utilized or applied to access corresponding services by the multi-SIM multi-standby communication device 200 is in an active state, otherwise, in a standby state.

In instances where the multi-SIM multi-standby communication device 200 is configured to operate in a single-standby mode, the processor unit 206 may communicate with the SIM database 220a to activate the stored SIM identification information related to one SIM card at a time. In other words, the multi-SIM multi-standby communication device 200, in a single-standby mode, may be operable to utilize SIM identification information activated for a single SIM card at a time. In instances where the multi-SIM multi-standby communication device 200 is configured to operate in a multi-standby mode, the processor unit 206 may be operable to communicate with the SIM database 220a to activate the stored SIM identification information corresponding to multiple SIM cards such as the SIM cards 212-222 at the same time. Specifically, the multi-SIM multi-standby communication device 200, in a multi-standby mode, may be operable to utilize SIM identification information activated for multiple SIM cards at the same time. In this regard, the processor unit 206 may be operable to allow a user of the multi-SIM multi-standby communication device 200 to utilize SIM identification information associated with each of the SIM cards 212-222 to receive corresponding services at the same time. For example, the user may therefore be allowed to utilize multiple numbers, multiple different service plans and/or network carriers associated with each of the multiple SIM cards 212-222 at the same time on the multi-SIM multi-standby communication device 200. The processor unit 206 comprises a communication processor 206a and an application processor 206b.

In various exemplary embodiments of the invention, the communication processor 206a may comprise suitable logic, circuitry, interfaces and/or code that may be operable to utilize a VMA 206c over a single radio resource unit such as the single radio resource unit 112c associated with the wireless radio unit 202 to support a multi-standby mode. The VMA 206c is a multi-SIM multi-standby platform and comprises a virtual modem controller (VMC), a Virtual Model Framework (VMF) and a plurality of VMs. Each VM in the VMA 206c is assigned or related to one of the multiple SIM cards 212-222. For a given time instant, a VM may operate in one of a plurality of VM states, namely, an active state, an idle state or a suspended state. To avoid radio resource conflicts, at most one of the VMs in the VMA 206c may be in an active state to transmit and/or receive traffic related to a corresponding SIM card. One or more VMs may be in an idle state at the same time depending on radio resources available in the single radio resource unit 112c for sharing. One or more VMs may be in a suspended state at the same time. Radio resources available in the single radio resource unit 112c may be shared among the VMs. In this regard, the VMA 206c may enable monitoring paging events related to each of related SIM cards. For example, VMs may receive a paging advertisement message from an associated cell to check incoming traffic. Upon detection of an intended traffic related to a specific SIM card such as the SIM card 212, which is to be handled by a particular VM, the VMA 206c may perform a procedural conflict check and/or a radio resource conflict check on other VMs to determine whether there are any conflicts. In instances where there may be one or more conflicts, the VMA 206c may be operable to arbitrate the conflicts and provide a resolution.

In instances where services and/or procedures associated with one or more of the SIM cards 214-222 are in progress, the VMA 206c may suspend the one or more VMs to ensure an uninterrupted radio resource usage by the VM related to the SIM card 212. Once radio resources become available in the single radio resource unit 112c for sharing by the suspended VMs, the VMA 206c may resume the suspended VMs so as to continue normal idle mode activities and/or tasks such as, for example, paging reception/decoding, serving cell measurements, neighbor cell measurements and/or location updating. In this regard, the VMA 206c may be operable to concurrently monitor paging events to check incoming traffic, and concurrently perform idle mode procedures such as location updating based on radio resources available in the single radio resource unit 112c.

In instances where no services and/or procedures associated with each of the SIM cards 214-222 is in progress, the VMA 206c may transition the VM related to the SIM card 212 from an idle state to an active state to transmit and/or receive the traffic related to the SIM card 212. The communication processor 206a may communicate the traffic related with the SIM card 212 to the application processor 206b to support desired applications.

The application processor 206b may comprise suitable logic, circuitry, interfaces and/or code that may be operable to run various applications such as video and/or audio multimedia applications. The application processor 206b may present applications to users through the user interface unit 204.

The SIM card controller 208 may comprise suitable logic, circuitry, interfaces and/or code that may be operable to manage and/or control connections from multiple SIM cards such as the SIM cards 212-222 to the SIM card sockets 208a-208c, which are directly coupled with the processor unit 206. In this regard, the SIM card controller 208 may be operable to establish connections between the SIM cards 212-222 and the processor unit 206. The SIM card controller 208 may be configured to switch SIM card connection from one to another as needed without re-booting the multi-SIM multi-standby communication device 200.

A SIM card such as the SIM card 214 may comprise suitable logic, circuitry, interfaces and/or code that may be operable to store subscriber personal identification information such as, for example, operator network, phone number, activated services, billing, and credit information. The SIM card 214 may also store the user's identity for gaining access to the network and receiving calls, and user's personal information such as phone directory and received SMS messages. The SIM card 214 may be implemented as a small printed circuit board. The SIM card 214 may be inserted in a mobile device such as the multi-SIM multi-standby communication device 200 in order for the multi-SIM multi-standby communication device 200 to properly access a corresponding network. The SIM card 214 may be connected to the multi-SIM multi-standby communication device 200 via the SIM card controller 208.

The memory 220 may comprise suitable logic, circuitry, interfaces and/or code that may be operable to store information such as executable instructions and data that may be utilized by the processor unit 206 and/or other device components such as, for example, the SIM database 208a. The SIM database 208a may comprise suitable logic, circuitry, interfaces and/or code that may be operable to record and/or store SIM identification information retrieved from one or more SIM cards such as the SIM cards 212-222. The stored SIM identification information may be in an active state or in a standby state within the SIM database 220a. For a given time instant, only SIM identification information in an active state may be actually utilized or applied by the multi-SIM multi-standby communication device 200 to support desired network services such as accounting/billing services. Depending on device configuration, for a given time instant, SIM identification information in an active state may correspond to one or more SIM cards. The memory 220 may comprise RAM, ROM, low latency nonvolatile memory such as flash memory and/or other suitable electronic data storage.

In an exemplary operation, a multi-SIM multi-standby communication device such as the multi-SIM multi-standby communication device 200 may be connected or coupled to multiple SIM cards such as the SIM cards 212-222 through the SIM card controller 208. The processor unit 206 may be operable to retrieve SIM identification information from the SIM cards 212-222. The retrieved SIM identification information may be stored in the SIM database 220a. In instances where the multi-SIM multi-standby communication device 200 is configured to operate in a multi-standby mode, the communication processor 206a may communicate with the SIM database 220a to activate the stored SIM identification information corresponding to multiple SIM cards such as the SIM cards 212-222 at the same time. More specifically, the multi-SIM multi-standby communication device 200, in a multi-standby mode, may utilize SIM identification information activated for the SIM cards 212-222 at the same time. A user of the multi-SIM multi-standby communication device 200 may therefore be allowed to receive services related to the SIM cards 212-222 at the same time. The communication processor 206a may run the VMF 206c over the single radio resource unit 112c to handle traffic through the wireless radio unit 202. Radio resources available in the single radio resource unit 112c may be shared among the VMs in the VMA 206c. At most one of the VMs may be scheduled in the active state to transmit and/or receive traffic related to a corresponding SIM card. The VMA 206c may be configured to suspend one or more VMs to ensure an uninterrupted radio resource usage by a VM related to a specific SIM card such as the SIM card 212 when needed. The suspended one or more VMs may be resumed so as to continue normal idle mode activities such as, for example, paging reception/decoding, serving cell measurements, and/or neighbor cell measurements whenever radio resources in the single radio resource unit 112c become available for sharing by the suspended VMs. In this regard, the resumed VMs may be operable to monitor paging events to check incoming traffic, and concurrently perform idle mode procedures such as cell selection/reselection by sharing radio resources available in the single radio resource unit 112c. The communication processor 206a may communicate received traffic with the application processor 206b. The application processor 206b may be operable to run various applications such as video and/or audio multimedia applications according to the received traffic and present to users through the user interface unit 204.

Figure 3:
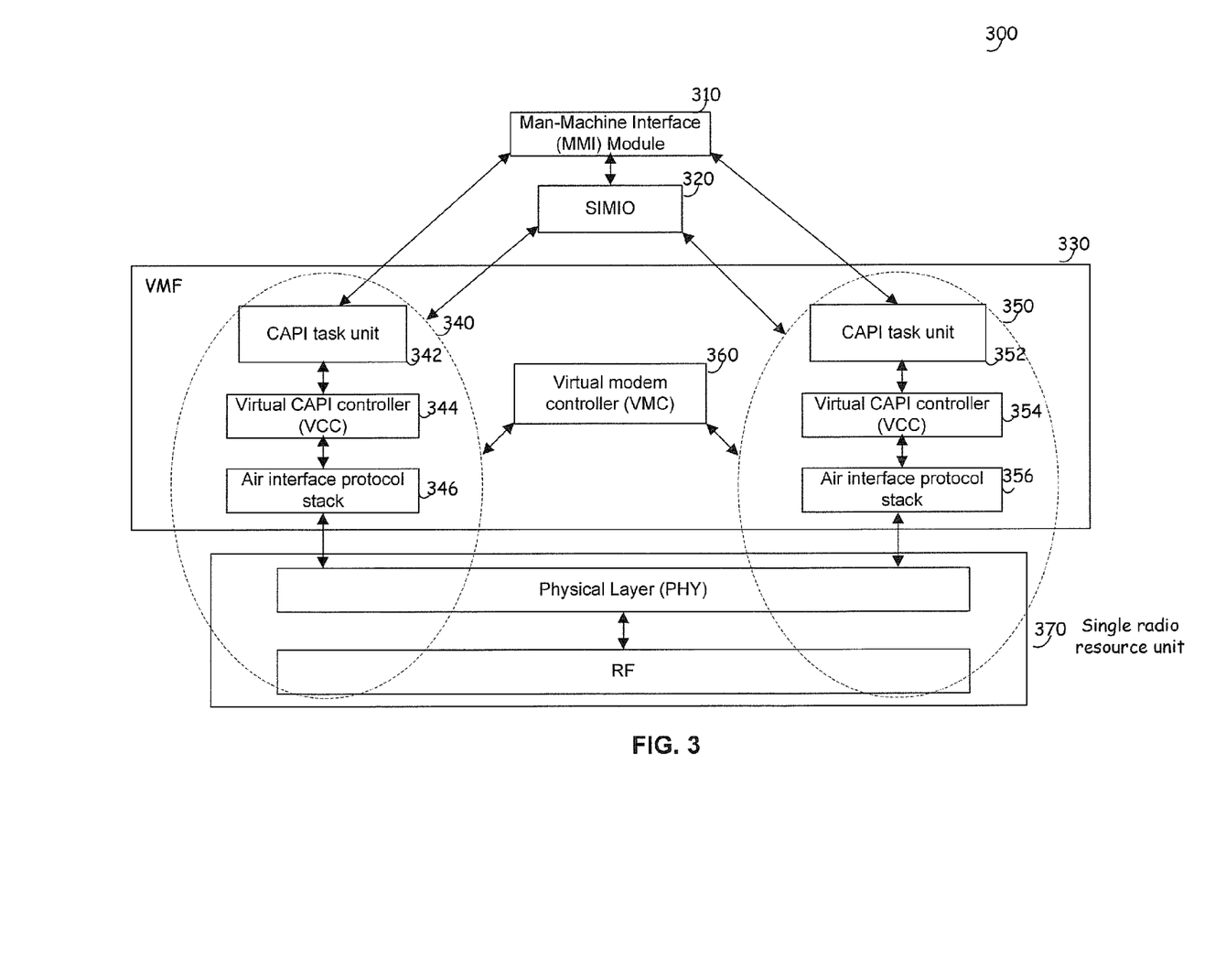
FIG. 3 is a block diagram illustrating an exemplary multi-instance virtual modem approach to concurrently handle multi-instance tasks on a multi-SIM multi-standby communication device, in accordance with an embodiment of the invention.

FIG. 3 is a block diagram illustrating an exemplary multi-instance virtual modem approach to concurrently handle multi-instance tasks on a multi-SIM multi-standby communication device, in accordance with an embodiment of the invention. Referring to FIG. 3, there is shown virtual modem architecture 300 utilized on the multi-SIM multi-standby communication device 200, for example. The virtual modem architecture 300 comprises man-machine interface (MMI) module 310, a SIMIO module 320, a virtual modem framework (VMF) 330, a virtual modem controller (VMC) 360, and a single radio resource unit 370.

The MMI module 310 may comprise suitable logic, interfaces and/or code that may be operable to provide interaction between a user of the multi-SIM multi-standby communication device 200 and one or more applications that are executed on the multi-SIM multi-standby communication device 200.

The SIMIO module 320 may comprise suitable logic, interfaces and/or code that may be operable to manage access to SIM cards such as the SIM cards 212-222.

The VMF 330 may comprise suitable logic, interfaces and/or code that may be operable to provide an enhancement to the Real Time Operating System. The VMF 330 may be deployed or implemented on the communications processor 206a.

A VM such as the VM 340 refers to an instance of an air interface protocol stack and/or its interface to the user, namely, a Common Application Programming Interface (CAPI), together with a single set of radio resources such as radio resources available in the single radio resource unit 370. A VM such as the VM 340 may comprise suitable logic, interfaces and/or code that may be operable to handle instances, namely, CAPI tasks and/or air interface protocol stack instances, associated with one of the SIM cards 212-222. Different VMs such as the VM 340 and the VM 350 may be configured to handle instances corresponding to two different SIM cards. For example, the VM 340 may handle instances related to the SIM card 212, while the VM 350 may be assigned to handle instances related to the SIM card 214. The plurality of VMs such as VMs 340-350 may be configured to share the same set of radio resources, namely, available radio resources in the single radio resource unit 370. In this regard, multiple copies of global and static data may be maintained to be utilized by the VMs 340-350, respectively. A VM such as the VM 340 may operate independently from other VMs and may be in one of the plurality of VM states, namely, an active state, an idle state and a suspended state. The VM 340 may comprise a CAPI task unit 342, a VCC 344, an air interface protocol stack 346 together with the single radio resource unit 370. CAPI and/or stack operations within the VM 340 may be managed via the VCC 344.

The CAPI task unit 342 may comprise suitable logic, interfaces and/or code that may be operable to process MMI or user requests. The CAPI task unit 342 comprises CAPI tasks related to a specific SIM card such as the SIM card 212.

A VCC such as the VCC 344 may comprise suitable logic, interfaces and/or code that may be operable to perform admission control with the VMC 360 for the CAPI module 315 at the primitive levels. The VCC 344 is a dual-instance module for managing its own task or instance, and queuing messages. The VCC 344 may be operable to interact with the VMC 360 for radio resource requests associated with CAPI tasks in the CAPI task unit 342. The VCC 344 may communicate with the air interface protocol stack 346 to coordinate stack operations corresponding to the CAPI tasks in the CAPI task unit 342.

An air interface protocol stack such as the air interface protocol stack 346 may comprise suitable logic, interfaces and/or code that may be operable to provide air interface protocols to support various signaling operations. For example, in 3GPP standard, the stack 346 may comprise Non-Access-Stratum (NAS) protocols and Access-Stratum (AS) protocols to handle bearer level signaling and Radio Resource Control (RRC) signaling, respectively.

The VMC 360 may comprise suitable logic, interfaces and/or code that may be operable to coordinate requests for the usage of radio resources available in the single radio resource unit 370 among multiple associated VMs such as the VM 340 and the VM 350. In this regard, the VMC 360 may be operable to resolve contention for radio resources by transitioning the VM 340 and the VM 350 between the three VM states. For example, the VMC 360 may be operable to ensure that at most one of the VM 340 and the VM 350 is in the active state for a given time instant. In this regard, the VMC 360 may suspend, for example, the VM 350 from using or sharing radio resources available in the single radio resource unit 370 in order to allow an uninterrupted radio resource usage by the VM 340. The suspended VM 350 may be resumed whenever radio resources in the single radio resource unit 370 become available for sharing by the VM 350 to continue idle mode activities on the VM 350.

The VMC 360 may be operable to coordinate the usage of the radio resources to support concurrent procedures initiated by the VM 340 and the VM 350. For example, the VM 340 and the VM 350 each may be granted by the VMC 360 a portion of radio resources available in the single radio resource unit 370 to concurrently monitor paging events and/or to concurrently perform idle mode procedures or activities such as, for example, cell selection/reselection by sharing the single radio resource unit 370.

The single radio resource unit 370 may comprise suitable logic, interfaces and/or code that may be operable to provide PHY and RF support.

In an exemplary operation, the MMI module 310 may interact between a user of the multi-SIM multi-standby communication device 200 and applications that are related to the SIM card 212 and the SIM card 214, for example, inserted into the SIM card controller 208. Tasks or instances related to the SIM card 212 and the SIM card 214 may be handled by the VM 340 and the VM 350, respectively. The VMC 360 may coordinate the usage of radio resources available in the single radio resource unit 370 for sharing by the VM 340 and the VM 350. For a given time instant, at most one of the VM 340 and the VM 350 may be allowed to use the single radio resource unit 370. In other words, for a given time instant, at most one of the VM 340 and the VM 350 may operate in an active state to transmit and/or receive traffic related to a corresponding SIM card. The VM 340 and/or the VM 350 may be in an idle state whenever there is no intended traffic for corresponding SIM cards detected. In an idle state, the VM 340 and the VM 350 may be operable to concurrently perform paging monitoring and/or idle mode procedures such as cell reselecting by sharing radio resources available in the single radio resource unit 370. For example, a VM such as the VM 340 in the idle state may be operable to check or detect an incoming traffic related to the SIM card 212 based on received paging messages. Upon detection of an intended traffic related to the SIM card 212, the VM 340 may remain in the idle state if traffic related to other SIM cards such as the SIM card 214 is still being handled. Otherwise, the VMC 360 may transition the VM 340 from the idle state to an active state in order to transmit and/or receive the detected traffic related to the SIM card 212.

Figure 4:
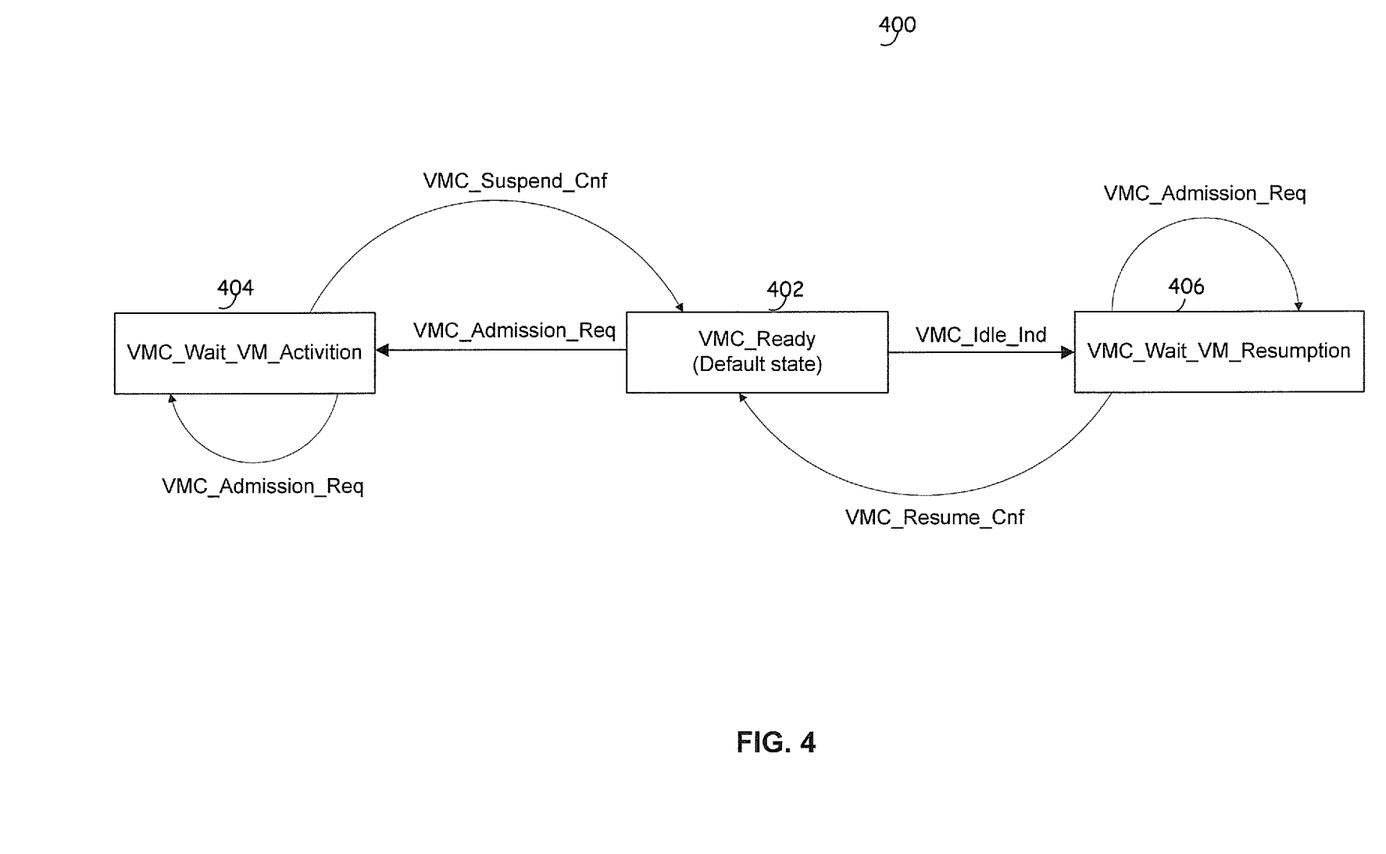
FIG. 4 is a block diagram illustrating an exemplary operation state machine that is utilized by a virtual modem controller to manage radio resource usage among a plurality of virtual models, in accordance with an embodiment of the invention.

FIG. 4 is a block diagram illustrating an exemplary operation state machine that is utilized by a virtual modem controller to manage radio resource usage among a plurality of virtual models, in accordance with an embodiment of the invention. Referring to FIG. 4, there is shown an exemplary state machine 400 that is utilized by the VMC 360. The state machine 400 comprise a VMC_Ready state 402, a VMC_Wait_VM_Activation state 404 and a VMC_Wait_VM_Resumption state 406.

The VMC_Ready state 402 is a state that indicates that the VMC 360 is ready to start processing admission control requests received from one or more VMs. The VMC_Wait_VM_Activation state 404 is a state that indicates that the VMC 360 waits for responses from one or more VMs to confirm activities on the one or more VMs are suspended and radio resources previously allocated on the one or more VMs are released. The VMC_Wait_VM_Resumption state 406 is a state that indicates that the VMC 360 waits for available radio resources in order to resume suspended one or more VMs.

The VMC_Ready state 402 may be set as a default state for the VMC 360. In the VMC_Ready state 402, the VMC 360 may be ready to coordinate the usage of radio resources available in the single radio resource unit 370 for sharing between the VM 340 and the VM 350, for example. The VMC 360 may be configured to act upon an admission control request while in the VMC_Ready state 402. The VMC 360 may receive an admission control request that may be initiated by a request from a CAPI task or from an instance of an air interface protocol stack. In instances where the VM 360 receives an admission request from, for example, the VM 340 in an idle state, to activate the VM 340, the VMC 360 may request the air interface protocol stack 356 of the VM 350 to suspend its ongoing activity and release the radio resources. While the confirmation from the air interface protocol stack 356 of the VM 350 is due for this action, the VMC 360 may transition from the VMC_Ready state 402 to the VMC_Wait_VM_Activation state 404 to wait for a response from the VM 350 in order to confirm that on-going activities on the VM 350 are suspended and radio resource previously allocated on the VM 350 are released. In instances where there is no conflict in allowing a new admission control request, the VMC 360 may transition from the VMC_Wait_VM_Activation state 404 back to the VMC_Ready state 402. The VMC 360 may save the admission control requests received in the VMC_Wait_VM_Activation state 404 and act upon the saved admission control requests when the VMC 360 is back in VMC_Ready state 420. This may ensure that the first admission request from an instance of CAPI or stack operation may be answered before responding to other subsequently received admission control requests.

In instances where a VM in an active state, for example, the VM 340, indicates that it is no longer using the radio resources, the VMC 360 may request the air interface protocol stack 356 of the VM 350 to resume its idle mode activities such as cell selection/reselection. While the confirmation from the air interface protocol stack 356 of the VM 350 is due for this action, the VMC 360 may transition from the VMC_Ready state 402 to the VMC_Wait_VM_Resumption state 406 to wait. In instances where there is no conflict in allowing a new admission control request, the VMC 360 may transition from the VMC_Wait_VM_Resumption state 406 stay back to the VMC Ready state 402. The VMC 360 may save the admission control requests received in the VMC_Wait_VM_Resumption state 406 and act upon the saved admission control requests when the VMC 360 is back in VMC_Ready state 420. This again may ensure that the first admission request from an instance of CAPI or stack operation may be answered before responding to other subsequently received admission control requests.

Figure 5:
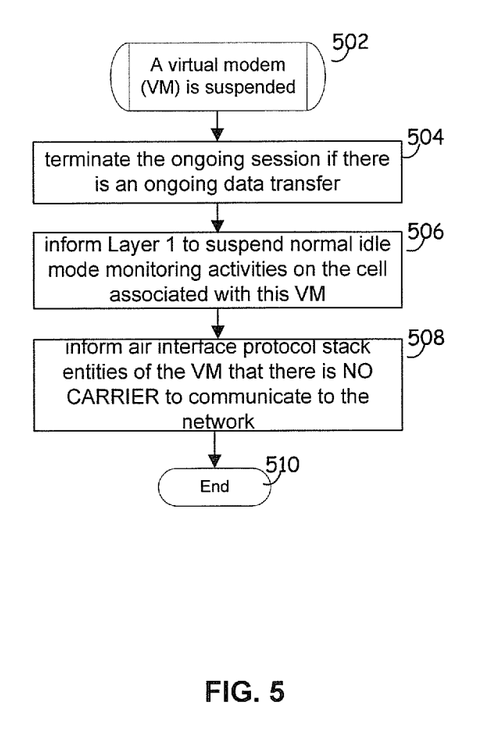
FIG. 5 is a flow chart illustrating exemplary steps that is performed by a virtual modem when the virtual modem is suspended, in accordance with an embodiment of the invention.

FIG. 5 is a flow chart illustrating exemplary steps that is performed by a virtual modem when the virtual modem is suspended, in accordance with an embodiment of the invention. Referring to FIG. 5, the exemplary steps may start with step 502. In step 502, a VM such as the VM 340 may be signaled by the VMC 360 for suspending from using or sharing radio resources available in the single radio resource unit 370. In step 504, in instances where the VM 340 is associated with an ongoing data transfer, the VM 340 may terminate the ongoing session(s) for the on-going data transfer. In step 506, the VM 340 may be operable to inform the single radio resource unit 370 to suspend normal idle mode monitoring activities on the cell associated with the VM 340. In step 508, the VM 340 may be operable to inform entities in the air interface protocol stack 346 that there is NO CARRIER that may be utilized to communicate with the network. The exemplary steps may end in step 510.

Figure 6:
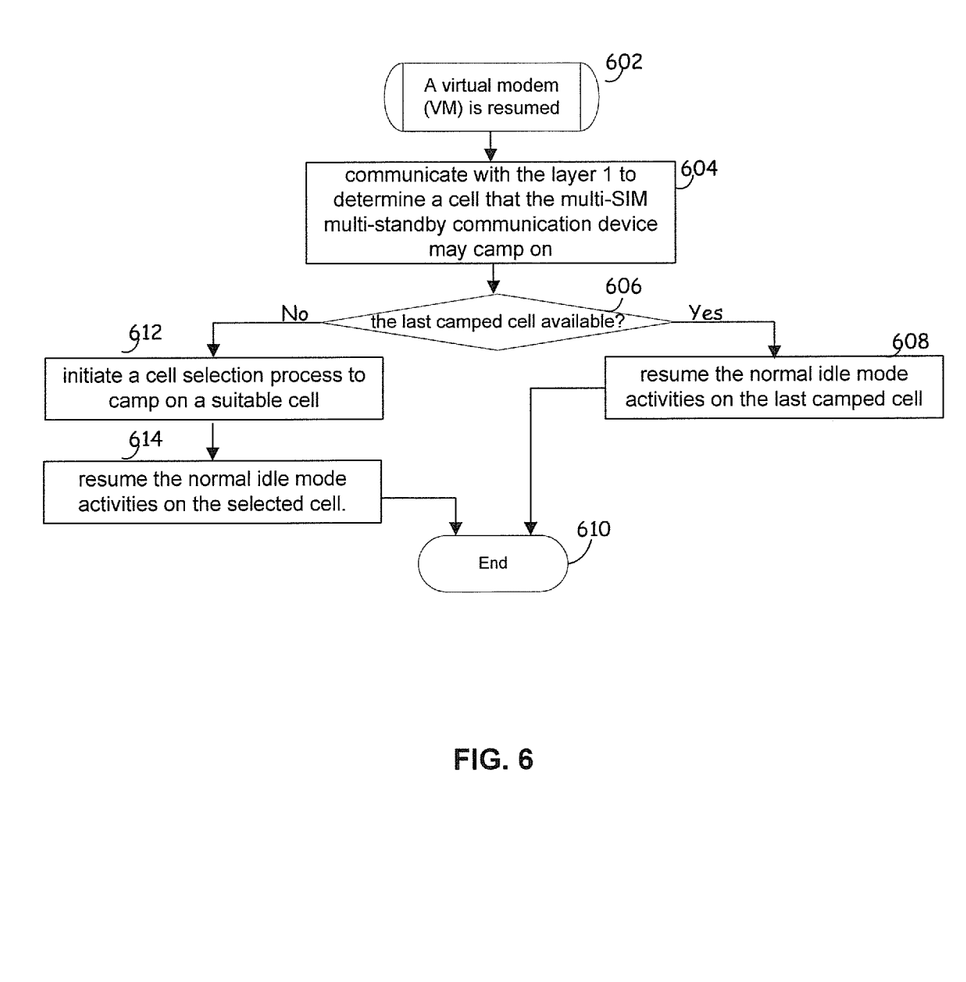
FIG. 6 is a flow chart illustrating exemplary steps that is performed by a virtual modem when the virtual modem is resumed, in accordance with an embodiment of the invention.

FIG. 6 is a flow chart illustrating exemplary steps that is performed by a virtual modem when the virtual modem is resumed, in accordance with an embodiment of the invention. Referring to FIG. 6, the exemplary steps may start with step 602. In step 602, a VM such as the VM 340 may be signaled by the VMC 360 for resuming normal idle mode activities from a suspended state. In step 604, the VM 340 may communicate with single radio resource unit 370 to determine or identify a cell that the multi-SIM multi-standby communication device 200 may camp on. In step 606, it may be determined whether the multi-SIM multi-standby communication device 200 is still operable to camp on the last camped cell. In instances where the multi-SIM multi-standby communication device 200 is still operable to camp on the last camped cell, then in step 608, the VM 340 may be operable to resume the normal idle mode activities on the last camped cell. The exemplary steps may end in step 610.

In step 606, in instances where the multi-SIM multi-standby communication device 200 is not allowed to camp on the last camped cell, then in step 612, the VM 340 may be operable to initiate a cell selection process to camp on a suitable cell. In step 614, the VM 340 may be operable to resume the normal idle mode activities on the selected cell. The exemplary steps may end in step 610.

Figure 7:
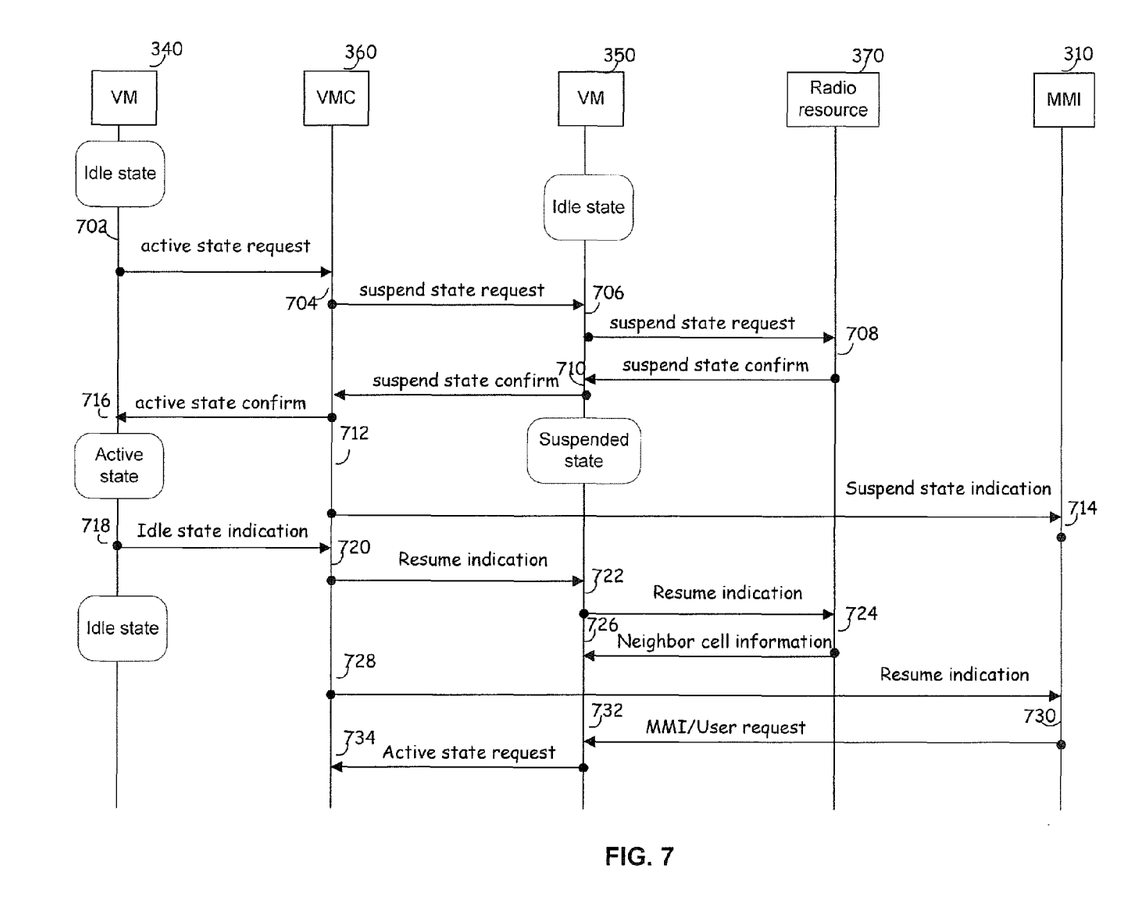
FIG. 7 is a flow chart illustrating an exemplary admission control procedure that is performed in a virtual modem framework on a multi-SIM multi-standby communication device, in accordance with an embodiment of the invention.

FIG. 7 is a flow chart illustrating an exemplary admission control procedure that is performed in a virtual modem framework on a multi-SIM multi-standby communication device, in accordance with an embodiment of the invention. Referring to FIG. 7, the exemplary steps may start with step 702. In step 702, the VM 340 that handles traffic related to, for example, the SIM card 212 is in an idle state. The VM 340 may be operable to monitor paging events so as to check or detect an incoming traffic related to the SIM card 212. In instances where incoming traffic related to the SIM card 212 is detected, the VM 340 may need to transition to an active state in order to transmit and/or receive the detected intended traffic. The VM 340 may be operable to send an active state request with an associated VM ID to the VMC 360. In step 704, upon receiving the active state request from the VM 340, the VMC 360 may be operable to perform a radio resource conflict check on each of other VMs such as the VM 350 in the VMF 330 in order to ensure that only one VM is allowed to utilize the single radio resource unit 370 at a given time. In instances where the VM 340 has a higher priority in radio usage than a counterpart VM such as the VM 350 in an idle state, for example, the VMC 360 may be operable to request that the VM 350 be suspended from utilizing the single radio resource unit 370. In this regard, the VMC 360 may send a suspended state request to the VM 350. In response, the VM 350 may inform the air interface protocol stack 356 that there is no network available. Concurrently, the VM 350 may also send a suspend state request to the single radio resource unit 370 to inform the single radio resource unit 370 to suspend normal idle state monitoring activities related to the VM 350. In step 708, the single radio resource unit 370 may suspend the VM 350 from radio resource usage on the single radio resource unit 370 and send a suspend state confirm message back to the VM 350.

In step 710, the VM 350 may send a suspend state confirm message to the VMC 360 once confirmed by the single radio resource unit 370. The VM 350 then enters into a suspended state. In step 712, upon successfully suspending other VMs such as the VM 350 from radio resource usage, the VMC 360 may send an active state confirm message to grant the VM 340 the active state request. The VMC 360 may inform the MMI module 310 that the VM 350 is suspended. In step 714, the MMI module 310 may suspend applications that are handled by the VM 350.

In step 716, upon receiving the active state confirm message from the VMC 360, the VM 340 enters to an active state to transmit and/or receive the detected intended traffic related to the SIM card 212. In step 718, in instances where communication on the detected intended traffic related to the SIM card 212 is complete, the VM 340 may send an idle state indication message to inform the VMC 360 that the VM 340 is no longer utilizing the radio resource and is returning to the idle state to perform the regular idle state procedures. In step 720, after receiving the idle state indication from the VM 340, the VMC 360 may resume other suspended VMs such as the VM 350 during admission control of the VM 340. The VMC 360 may send a resume request message to the VM 350 to continue its idle state activities.

In step 722, upon receiving a resume request from the VMC 360, the VM 350 may send a resume request to the single radio resource unit 370 indicating radio resource usages for normal idle mode activities. In step 724, the single radio resource unit 370 may be operable to provide information on neighbor cells available for the VM 350. In step 726, the VM 350 may be operable to select one or more strong neighbor cells from the available neighbor cells for normal idle mode activities. In step 728, the VMC 360 may send a resume indication message to the MMI nodule 310 to continue application. In step 730, the MMI module 310 may be operable to continue the applications handled by the VM 350. In instances where a mobile originated service is required on the VM 350, a MMI/user message is sent to the VM 350. In step 732, the VM 350 may be operable to send an active state request to the VMC 360 for radio resource usage to support corresponding intended traffic. The admission control process may continue as needed.

In various exemplary aspects of the method and system for multi-standby operation for a multi-SIM multi-standby communication device, a multi-SIM and multi-standby communication device such as the multi-SIM multi-standby communication device 200 comprises a single radio resource unit such as the single radio resource unit 370. The single radio resource unit 370 is shared by a plurality of VMs such as the VM 340 and the VM 350 in the VMA 112c. The VMF 330 is deployed over the single radio resource unit 370. Each VM is uniquely associated with a single one of a plurality of SIM cards such as the SIM cards 212-222 that are coupled to the multi-SIM multi-standby communication device 200 through the SIM card controller 208. The multi-SIM multi-standby communication device 200 may be operable to concurrently handle traffic related to each of the SIM cards 212-222 utilizing a corresponding one of VMs in the VMF 330. For example, the VM 340 and the VM 350 may be responsible to handle traffic related to the SIM card 212 and the SIM card 214, respectively.

Radio resource available in the single radio resource unit 370 may be shared by each of the SIM 212-222 according to corresponding VM states, namely, an active state, an idle state and a suspended state. For example, the VMC 360 may be configured to handle the usage of radio resources for VMs in an active state. VMs in a suspended state may not be allowed to use or share radio resources available in the single radio resource unit 370. Limited radio resources may be provided or allocated to VMs in an idle state to support idle mode activities such as location updating. In this regard, in the idle state, one or more VMs such as the VM 340 and the VM 350 may be operable to concurrently perform idle mode tasks and/or procedures such as, for example, cell selection and/or cell reselection. In addition, in the idle state, the VM 340 and the VM 350 may be operable to concurrently monitoring paging events related to the SIM card 212 and the SIM card 214, respectively. For example, an intended traffic such as an incoming traffic related to the SIM card 212 may be detected by the VM 340 from paging messages received in the monitored paging events.

To ensure an uninterrupted radio resource usage on the VM 340, the VMC 360 may be operable to suspend the virtual modem 350, which is not related to the detected intended traffic, based on the radio resources available in the single radio resource unit 370. The VMC 360 may signal the VM 340 to transition from the idle state to an active state after the VM 350 is suspended. In the active mode, the VM 340 may be operable to communicate the detected intended traffic utilizing radio resources available in the single radio resource unit 370. Once the communication is complete, the VM 340 may signal to the VMC 360 to indicate that radio resources allocated to the VM 340 is no longer needed. In this regard, the VMC 360 may then signal the suspended VM 350 to resume the VM 350 to continue idle mode activities and/or tasks.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for multi-standby operation for a multi-SIM multi-standby communication device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a multiple-subscriber identity module (multi-SIM) multi-standby communication device comprising a single wireless radio that is shared by a plurality of virtual modems based on corresponding virtual modem states:
detecting a traffic intended for a specified virtual modem in an idle state;
sending a suspend state request to one or more virtual modems that are not related to said detected traffic to suspend said one or more virtual modems by terminating one or more ongoing communication sessions associated with said one or more virtual modems;
in response to said suspend state request, receiving a suspend state confirmation message from said one or more virtual modes confirming said suspension;
transitioning said specified virtual modem from the idle state to an active state; and
communicating said detected traffic via said specified virtual modem using a radio resource available in said single wireless radio,
wherein each of said plurality of virtual modems is associated with a single one of a plurality of subscriber identity module (SIM) cards.

2. The method according to claim 1, wherein said virtual modem states comprise an active state, an idle state, and a suspended state.

3. The method according to claim 2, comprising concurrently performing idle mode activities utilizing virtual modems in said idle state.

4. The method according to claim 2, comprising concurrently monitoring paging events utilizing virtual modems in said idle state.

5. The method according to claim 1, comprising resuming said one or more suspended virtual modems after said specified virtual modem indicates that said communication is complete.

6. A system for communication, the system comprising:
one or more processors and/or circuits for use in a multiple-subscriber identity module (multi-SIM) multi-standby communication device comprising a single wireless radio that is shared by a plurality of virtual modems based on corresponding virtual modem states, said one or more processors and/or circuits being configured to:

detect a traffic intended for a specified virtual modem in an idle state;

send a suspend state request to one or more virtual modems that not related to said detected traffic to suspend said one or more virtual modems by terminating one or more ongoing communication sessions associated with said one or more virtual modems;

in response to said suspend state request, receive a suspend state confirmation message from said one or more virtual modems confirming said suspension;

transition said specified virtual modem from the idle state to an active state; and communicate said detected traffic via said specified virtual modem using a radio resource available in said single wireless radio, wherein each of said plurality of virtual modems is associated with a single one of a plurality of subscriber identity module (SIM) cards.

7. The system according to claim 6, wherein said virtual modem states comprise an active state, an idle state, and a suspended state.

8. The system according to claim 7, wherein said one or more processors and/or circuits are configured to concurrently perform idle mode activities utilizing virtual modems in said idle state.

9. The system according to claim 7, wherein said one or more processors and/or circuits are configured to concurrently monitor paging events utilizing virtual modems in said idle state.

10. The system according to claim 6, wherein said one or more processors and/or circuits are configured to resume said one or more suspended virtual modems after said specified virtual modem indicates that said communication is complete.

* * * * *

UNITED STATES PATENT AND TRADEMARK OFFICE
CERTIFICATE OF CORRECTION

PATENT NO.        : 8,874,167 B2
APPLICATION NO.   : 12/816782
DATED             : October 28, 2014
INVENTOR(S)       : Qiu et al.

Page 1 of 1

It is certified that error appears in the above-identified patent and that said Letters Patent is hereby corrected as shown below:

In the Claims,

Column 17, line 7, please replace "that not" with --that are not--.

Signed and Sealed this
Seventeenth Day of February, 2015

Michelle K. Lee
*Deputy Director of the United States Patent and Trademark Office*